(12) United States Patent
Kaku (10) Patent No.: US 12,204,688 B2
(45) Date of Patent: Jan. 21, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/162,914

(22) Filed: Feb. 1, 2023

(65) Prior Publication Data

US 2023/0244311 A1 Aug. 3, 2023

(30) Foreign Application Priority Data

Feb. 2, 2022 (JP) ................................ 2022-015245

(51) Int. Cl.
| | |
|---|---|
| *G06F 3/01* | (2006.01) |
| *G06T 7/70* | (2017.01) |
| *G06T 17/00* | (2006.01) |
| *G09G 3/3208* | (2016.01) |

(52) U.S. Cl.
CPC ............... *G06F 3/013* (2013.01); *G06T 7/70* (2017.01); *G06T 17/00* (2013.01); *G09G 3/3208* (2013.01); *G06T 2207/30196* (2013.01)

(58) Field of Classification Search
CPC . G06F 3/013; G06F 3/011; G06T 7/70; G06T 17/00; G06T 2207/30196; G09G 3/3208; G09G 3/002; G09G 2320/0261; G09G 2320/0686; G09G 2354/00; H04N 13/302; H04N 13/351; H04N 13/368; H04N 13/383; H04N 13/32; H04N 13/398

See application file for complete search history.

(56) References Cited

U.S. PATENT DOCUMENTS

| | | | | |
|---|---|---|---|---|
| 2009/0058845 | A1* | 3/2009 | Fukuda | G02F 1/1323 345/214 |
| 2011/0216171 | A1* | 9/2011 | Barre | H04N 13/30 348/51 |
| 2011/0310003 | A1* | 12/2011 | de la Barre | H04N 13/368 345/156 |
| 2015/0163481 | A1* | 6/2015 | de la Barre | H04N 13/351 348/51 |
| 2016/0212417 | A1* | 7/2016 | Ng | H04N 13/351 |
| 2016/0261837 | A1* | 9/2016 | Thompson | H04N 9/3185 |

(Continued)

FOREIGN PATENT DOCUMENTS

| | | |
|---|---|---|
| JP | 2021-005071 A | 1/2021 |
| WO | 2012/150703 A1 | 11/2012 |
| WO | 2016-140056 A | 8/2016 |

*Primary Examiner* — Michael Lee
(74) *Attorney, Agent, or Firm* — Sughrue Mion, PLLC (57) ABSTRACT

A controller of an information processing apparatus is configured to, for each of multiple viewers of a light field display: identify a three-dimensional coordinate position of eyes; generate an image according to the identified three-dimensional coordinate position of the eyes; identify, based on the identified three-dimensional coordinate position of the eyes, a channel to which the generated image is to be output, of a plurality of channels associated with a plurality of light rays to be emitted from the light field display, respectively; and output the generated image to the identified channel.

7 Claims, 4 Drawing Sheets

(56) References Cited

U.S. PATENT DOCUMENTS

2016/0349503 A1\* 12/2016 Grossmann .......... H04N 13/302
2017/0013254 A1\* 1/2017 Andersson ......... H04N 21/4316
2019/0281280 A1 9/2019 Baldwin et al.
2021/0132693 A1\* 5/2021 Pulli .................. G02B 27/0093

\* cited by examiner

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-015245 filed on Feb. 2, 2022, the entire contents of which are incorporated herein by reference.

TECHNICAL FIELD

The present disclosure relates to an information processing apparatus, a method, and a program.

BACKGROUND

Technology regarding light field displays that are capable of displaying stereoscopic images is known. For example, Patent Literature (PTL) 1 discloses technology for projecting arbitrary virtual images to be perceived by viewers by controlling light to be emitted from each pixel of a light field display.

CITATION LIST

Patent Literature

PTL 1: JP 2021-005071 A

SUMMARY

In the conventional technology, when a single light field display is viewed by multiple viewers, for example, it may become difficult to prepare pixels corresponding to each viewer's perspective and control light to be emitted from each pixel, as the number of the viewers increases. Therefore, there is room for improvement with respect to technology for providing multiple viewers with stereoscopic images.

It would be helpful to improve technology for providing multiple viewers with stereoscopic images.

An information processing apparatus according to an embodiment of the present disclosure includes a controller configured to, for each of multiple viewers of a light field display:
identify a three-dimensional coordinate position of eyes;
generate an image according to the identified three-dimensional coordinate position of the eyes;
identify, based on the identified three-dimensional coordinate position of the eyes, a channel to which the generated image is to be output, of a plurality of channels associated with a plurality of light rays to be emitted from the light field display, respectively; and
output the generated image to the identified channel.

A method according to an embodiment of the present disclosure is a method performed by an information processing apparatus, the method including, for each of multiple viewers of a light field display:
identifying a three-dimensional coordinate position of eyes;
generating an image according to the identified three-dimensional coordinate position of the eyes;
identifying, based on the identified three-dimensional coordinate position of the eyes, a channel to which the generated image is to be output, of a plurality of channels associated with a plurality of light rays to be emitted from the light field display, respectively; and
outputting the generated image to the identified channel.

A program according to an embodiment of the present disclosure is configured to cause a computer to execute operations, the operations including, for each of multiple viewers of a light field display:
identifying a three-dimensional coordinate position of eyes;
generating an image according to the identified three-dimensional coordinate position of the eyes;
identifying, based on the identified three-dimensional coordinate position of the eyes, a channel to which the generated image is to be output, of a plurality of channels associated with a plurality of light rays to be emitted from the light field display, respectively; and
outputting the generated image to the identified channel.

According to an embodiment of the present disclosure, technology for providing multiple viewers with stereoscopic images can be improved.

BRIEF DESCRIPTION OF THE DRAWINGS

In the accompanying drawings.

DETAILED DESCRIPTION

Hereinafter, an embodiment of the present disclosure will be described.

Figure 1:
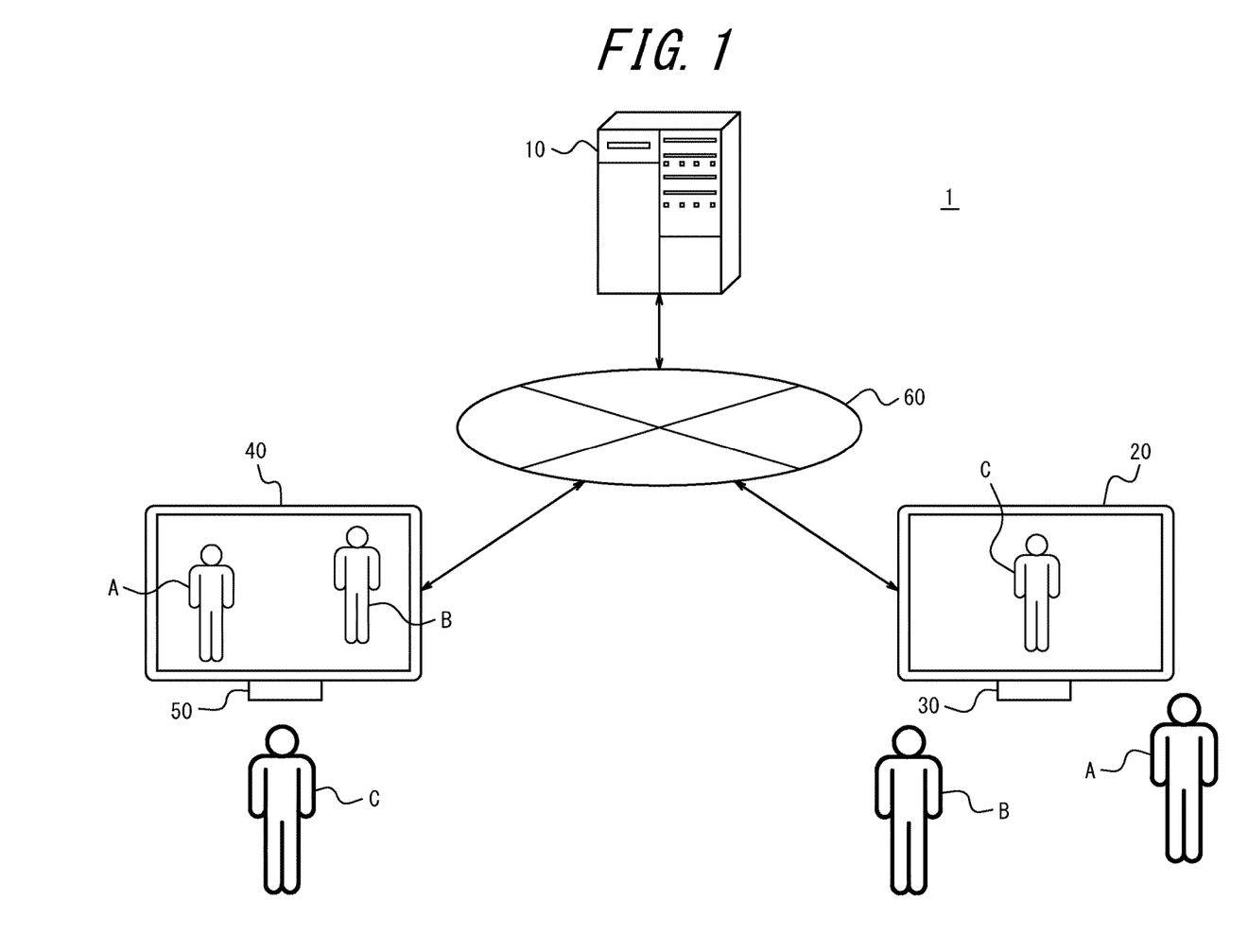
FIG. 1 is a block diagram illustrating a schematic configuration of a system according to an embodiment of the present disclosure.

An outline of a system 1 according to the embodiment of the present disclosure will be described with reference to FIG. 1.

The system 1 includes an information processing apparatus 10, a first light field display (LFD) 20, a first camera 30, a second LFD 40, and a second camera 50. The information processing apparatus 10, the first LFD 20, and the second LFD 40 are communicably connected to a network 60.

The information processing apparatus 10 is a computer such as a server that belongs to a cloud computing system or another type of computing system.

The first LFD 20 and the second LFD 40 are any displays that employ a light field method capable of reproducing light rays emitted by any object. The first LFD 20 and the second LFD 40 each have a plurality of channels corresponding to a plurality of light rays to be emitted from the display, respectively. The first LFD 20 and the second LFD 40 each achieve a super multi-view image, by outputting images that are input to the respective channels, as light rays whose emission directions are in the left-right direction of a screen. A viewing angle in the left-right direction of the screen is 130 degrees, for example, but is not limited to this. The number of the light rays is 69, for example, light rays 1 to 69, but is not limited to this. The number of the channels is 69, for example, channels 1 to 69, but is not limited to this.

The image may also include a moving image or a still image. The first LFD 20 and the second LFD 40 may each be, for example, a display that is constituted of a combination of multiple (e.g., three) arbitrary displays employing the light field method with a viewing angle of 130 degrees.

The first camera 30 and the second camera 50 are each an RGB-D camera that can capture range images, in addition to color images, for example, but are not limited to this. In the present embodiment, the first camera 30 is disposed at the lower center of the screen of the first LFD 20, but is not limited to this. In the present embodiment, the second camera 50 is disposed at the lower center of the screen of the second LFD 40, but is not limited to this.

The network 60 includes the Internet, at least one wide area network (WAN), at least one metropolitan area network (MAN), or any combination thereof. The network 60 may include at least one wireless network, at least one optical network, or any combination thereof. The wireless network is, for example, an ad hoc network, a cellular network, a wireless local area network (LAN), a satellite communication network, or a terrestrial microwave network.

An outline of the present embodiment will be described with reference to FIG. 1.

A controller 11 of the information processing apparatus 10 identifies, for each of multiple viewers A and B of the first LFD 20, a three-dimensional coordinate position of eyes. The controller 11 then generates an image according to the identified three-dimensional coordinate position of the eyes. The controller 11 then identifies, based on the identified three-dimensional coordinate position of the eyes, a channel to which the generated image is to be output, of channels associated with a plurality of light rays to be emitted from the first LFD 20, respectively. The controller 11 then outputs the generated image to the identified channel.

According to the present embodiment, for each of the multiple viewers, the image according to the three-dimensional coordinate position of the eyes is output to the channel of the light field display corresponding to the three-dimensional coordinate position of the eyes. Therefore, technology for providing multiple viewers with stereoscopic images can be improved.

Figure 2:
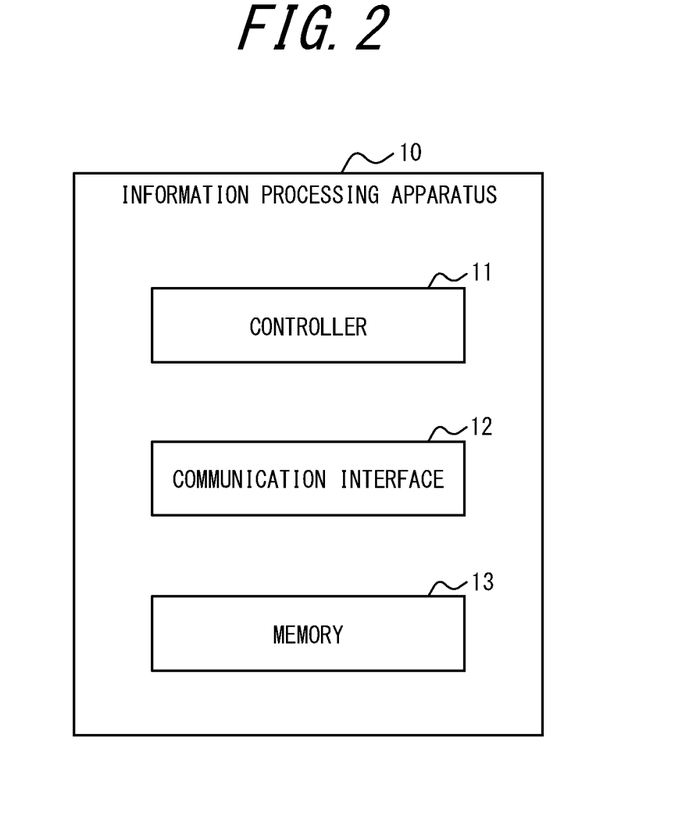
FIG. 2 is a block diagram illustrating a schematic configuration of an information processing apparatus according to the embodiment of the present disclosure.

A configuration of the information processing apparatus 10 according to the present embodiment will be described with reference to FIG. 2.

The information processing apparatus 10 includes the controller 11, a communication interface 12, and a memory 13.

The controller 11 includes at least one processor, at least one programmable circuit, at least one dedicated circuit, or any combination thereof. The processor is a general purpose processor such as a central processing unit (CPU) or a graphics processing unit (GPU), or a dedicated processor that is dedicated to specific processing. The programmable circuit is, for example, a field-programmable gate array (FPGA). The dedicated circuit is, for example, an application specific integrated circuit (ASIC). The controller 11 executes processing related to operations of the information processing apparatus 10 while controlling components of the information processing apparatus 10. In the present embodiment, the controller 11 controls operations of a virtual camera that can capture a subject image of any three-dimensional model disposed in virtual space.

The communication interface 12 includes at least one interface for communication. The interface for communication is compliant with, for example, a mobile communication standard, a wired LAN standard, or a wireless LAN standard, but not limited to these, and may be compliant with any communication standard. The communication interface 12 receives data to be used for the operations of the information processing apparatus 10. The communication interface 12 sends data obtained by the operations of the information processing apparatus 10.

The memory 13 includes at least one semiconductor memory, at least one magnetic memory, at least one optical memory, or any combination thereof. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 13 functions as, for example, a main memory, an auxiliary memory, or a cache memory. The memory 13 stores the data to be used for the operations of the information processing apparatus 10 and the data obtained by the operations of the information processing apparatus 10. In the present embodiment, the data to be used for the operations of the information processing apparatus 10 includes a system program, an application program, a database, texture images, and the like.

Figure 3:
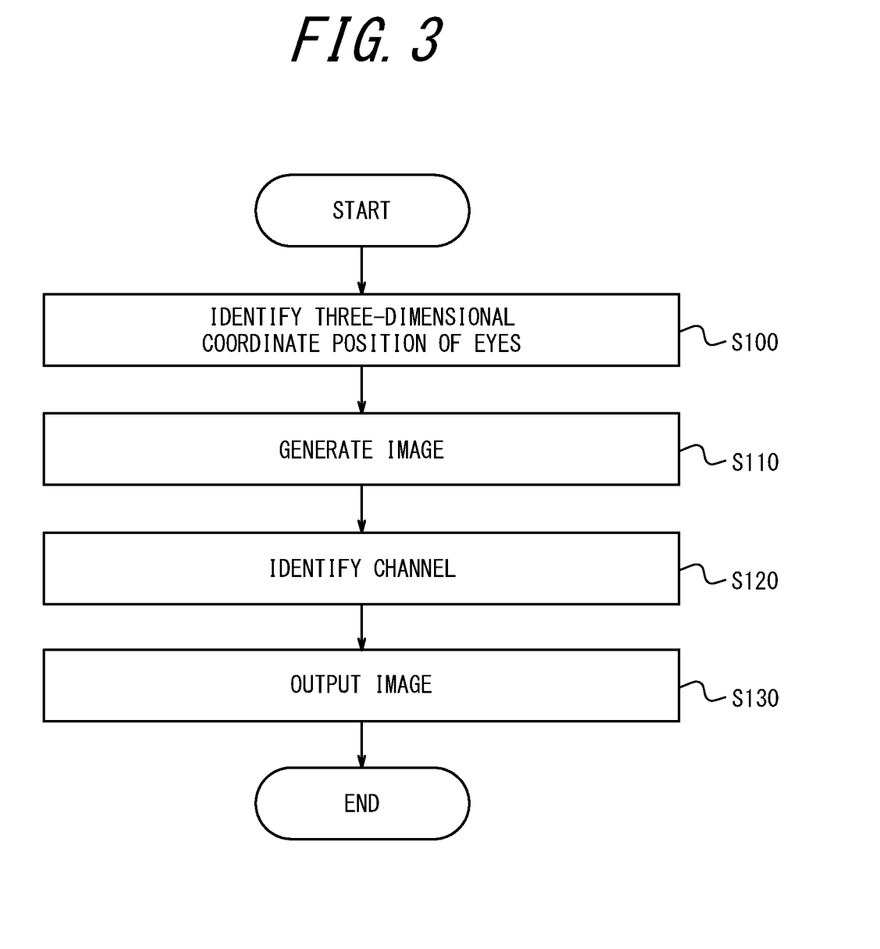
FIG. 3 is a flowchart illustrating operations of the information processing apparatus according to the embodiment of the present disclosure.

The operations of the information processing apparatus 10 according to the present embodiment will be described with reference to FIG. 3. These operations correspond to a method according to an embodiment of the present disclosure.

In this example, it is assumed that the viewers A and B, which correspond to multiple viewers, are viewing the first LFD 20, which corresponds to a light field display, and are having an online conference with a viewer C, who is located in front of the second LFD 40. However, the present disclosure is not limited to this and the number of viewers may be arbitrarily determined.

Step S100: The controller 11 of the information processing apparatus 10 identifies, for each of the viewers A and B, a three-dimensional coordinate position of eyes.

Figure 4:
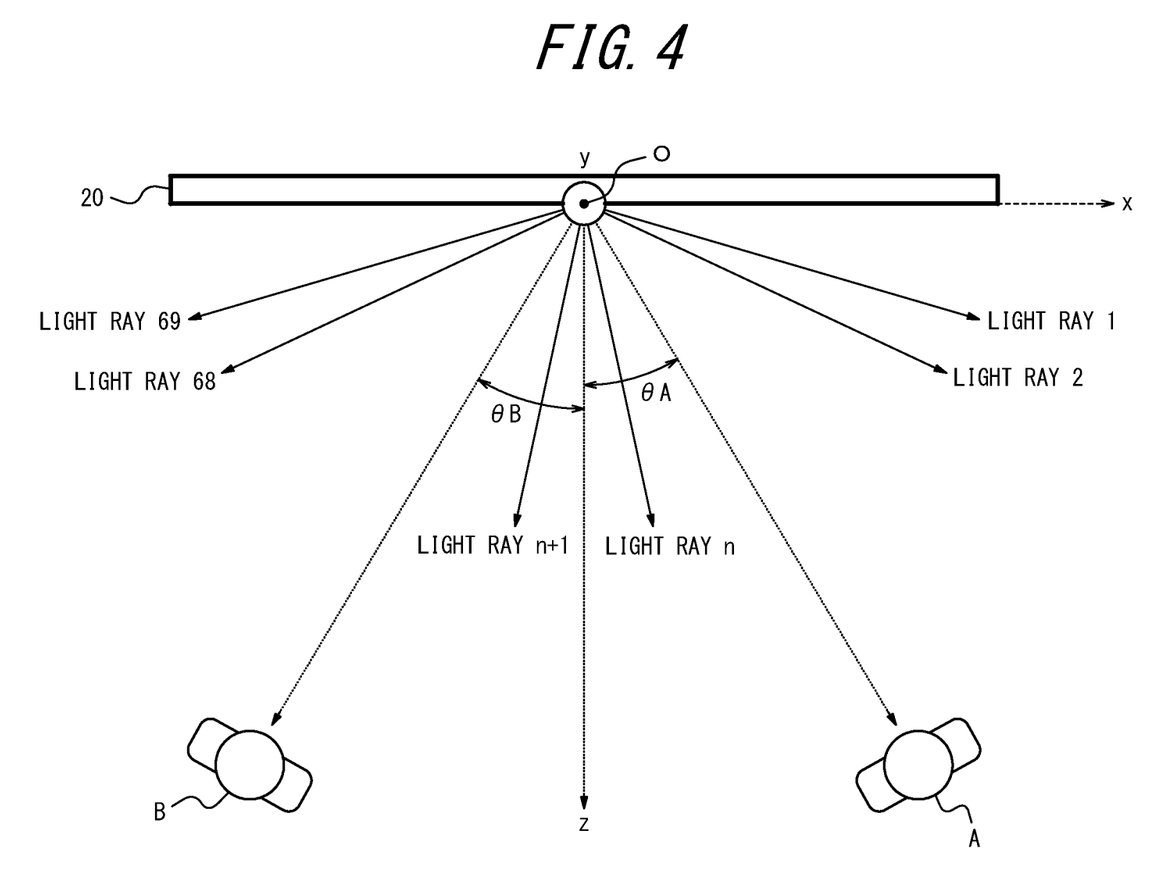
FIG. 4 is a drawing illustrating the positional relationship between a light field display and multiple viewers according to the embodiment of the present disclosure.

Specifically, the controller 11 of the information processing apparatus 10 identifies a three-dimensional coordinate position (xA, yA, zA) of eyes of the viewer A imaged by the first camera 30. The controller 11 also identifies a three-dimensional coordinate position (xB, yB, zB) of eyes of the viewer B imaged by the first camera 30. Note that, a coordinate system (x, y, z) is a coordinate system in real space. For example, as illustrated in FIG. 4, an origin O is taken at the center of the screen, an x axis is taken in the right direction of the screen of the first LFD 20, an y axis in the upper direction of the screen, and a z axis in the front direction of the screen, but the present disclosure is not limited to this.

Step S110: The controller 11 of the information processing apparatus 10 generates, for each of the viewers A and B, an image according to the three-dimensional coordinate position of the eyes identified in step S100.

Specifically, the controller 11 of the information processing apparatus 10 generates a three-dimensional model corresponding to the viewer C, based on an image of the viewer C captured by the second camera 50. The three-dimensional model may be constituted of, for example, polygons to which the texture images are projected by texture mapping techniques, but is not limited to this. The controller 11 then disposes the generated three-dimensional model in virtual space. The controller 11 then disposes a virtual camera A1 at a three-dimensional coordinate position (XA, YA, ZA) in the virtual space, corresponding to the three-dimensional coordinate position (xA, yA, zA) of the eyes of the viewer A identified in step S100. The controller 11 also disposes a virtual camera B1 at a three-dimensional coordinate position (XB, YB, ZB) in the virtual space, corresponding to the three-dimensional coordinate position (xB, yB, zB) of the eyes of the viewer B identified in step S100. Note that, a three-dimensional coordinate position (x, y, z) in the real space is mapped to a three-dimensional coordinate position (X, Y, Z) in the virtual space by a coordinate transformation predetermined by any method. Then, the controller 11 generates (renders) an image A2 that includes a subject image of the three-dimensional model corresponding to the viewer C who is present within a field of view (imaging range) of the virtual camera A1. The controller 11 also generates (renders) an image B2 that includes a subject image of the three-dimensional model corresponding to the viewer C who is present within a field of view (imaging range) of the virtual camera B1. Therefore, the image A2 is an image of the three-dimensional model corresponding to the viewer C in the virtual space viewed from the virtual camera A1, as a viewpoint. The image B2 is an image of the three-dimensional model corresponding to the viewer C in the virtual space viewed from the virtual camera B1, as a viewpoint.

Step S120: The controller 11 of the information processing apparatus 10 identifies, for each of the viewers A and B, a channel to which the image generated in step S110 is to be output, of the channels associated with the plurality of light rays to be emitted from the first LFD 20, respectively, based on the three-dimensional coordinate position of the eyes identified in step S100.

Specifically, in a coordinate system in the real space illustrated in FIG. 4, the controller 11 of the information processing apparatus 10 identifies an angle θA between a vector (0, 0, 1) and a vector (xA, 0, zA) for the viewer A, and identifies an angle θB between the vector (0, 0, 1) and a vector (xB, 0, zB) for the viewer B. The controller 11 then identifies a channel associated with a light ray whose emission angle coincides with the identified θ or a channel associated with a light ray whose emission angle is the closest to the identified θ, of the plurality of light rays (for example, light rays 1 to 69) to be emitted from the first LFD 20. For example, the controller 11 identifies a channel 30 associated with a light ray 30 for θA, and identifies a channel 50 associated with a light ray 50 for θB.

Step S130: The controller 11 of the information processing apparatus 10 outputs, for each of the viewers A and B, the image generated in step S110 to the channel identified in step S120.

Specifically, the controller 11 of the information processing apparatus 10 outputs the image A2 via the communication interface 12 to the channel 30 identified in step S120. The controller 11 also outputs the image B2 via the communication interface 12 to the channel 50 identified in step S120. This allows the viewer A to view the image A2, and the viewer B to view the image B2. Here, the channels correspond to segments on input video, not physical input terminals. In this case, for example, one video divided into 69 segments is serially input via an HDMI® (HDMI is a registered trademark in Japan, other countries, or both) terminal, and synthesized and the like as appropriate on the side of the first LFD 20. The channels may correspond to physical input terminals. In this case, the first LFD 20 has, for example, 69 HDMI® terminals.

As described above, the controller 11 of the information processing apparatus 10 identifies, for each of the multiple viewers A and B of the first LFD 20, the three-dimensional coordinate position of the eyes. The controller 11 then generates the image according to the identified three-dimensional coordinate position of the eyes. The controller 11 then identifies, based on the identified three-dimensional coordinate position of the eyes, the channel to which the generated image is to be output, of the channels associated with the plurality of light rays to be emitted from the first LFD 20, respectively. The controller 11 then outputs the generated image to the identified channel.

According to such a configuration, for each of the multiple viewers, the image according to the three-dimensional coordinate position of the eyes is output to the channel of the light field display, corresponding to the three-dimensional coordinate position of the eyes. Therefore, technology for providing multiple viewers with stereoscopic images can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

As a variation, an embodiment in which the configuration and operations of the information processing apparatus 10 are distributed to multiple computers capable of communicating with each other can be implemented. For example, of processing in step S110 in the above embodiment, processing on the side of the viewers A and B and processing on the side of the viewer C may be distributed and executed by two computers that can communicate with each other.

As another variation, the controller 11 of the information processing apparatus 10 may also output the image generated in step S110 in the above embodiment to channels associated with emission angles adjacent to the emission angle of the light ray associated with the channel identified in step S120 in the above embodiment. For example, the controller 11 identifies a channel 29 associated with a light ray 29 for θA−1 adjacent to θA illustrated in FIG. 4, and a channel 31 associated with a light ray 31 for θA+1 adjacent to θA. The controller 11 also identifies a channel 49 associated with a light ray 49 for θB−1 adjacent to OB illustrated in FIG. 4, and a channel 51 associated with a light ray 51 for θB+1 adjacent to θB. Then, the controller 11 outputs the image A2 to the channels 29 and 31 as well as the channel 30, and outputs the image B2 to the channels 49 and 51 as well as the channel 50, via the communication interface 12. According to this variation, latency owing to movement of the viewers A and B can be improved.

As yet another variation, the controller 11 of the information processing apparatus 10 may output a prediction image according to a prediction on movement of each of the viewers A and B, by performing the following processing. Specifically, the controller 11 predicts, for each of the viewers A and B, a three-dimensional coordinate position of the eyes after a predetermined time from the current time, based on a three-dimensional coordinate position of the eyes before a predetermined time from the current time. The three-dimensional coordinate position of the eyes before the predetermined time from the current time may be identified in the same manner as in step S100 in the above embodiment, and stored in advance in the memory 13. The predetermined times are arbitrarily determined. The controller 11 then generates a prediction image according to the predicted three-dimensional coordinate position of the eyes, in the same manner as in step S110 in the above embodiment. The controller 11 then identifies a channel to which the generated prediction image is to be outputted based on the predicted three-dimensional coordinate position of the eyes, in the same manner as in step S120 in the above embodiment. The controller 11 then outputs the generated prediction image to the identified channel, in the same manner as in step S130 in the above embodiment. When the predicted three-dimensional coordinate positions of the eyes coincide with each other between the viewers A and B, the controller 11 may output a prediction image according to a three-dimensional coordinate position of eyes of a viewer, of the viewers A and B, whose predicted three-dimensional coordinate position of the eyes is the closest to the first LFD 20. According to this variation, latency owing to movement of the viewers A and B can be improved. This variation is also applicable to a case in which each of the viewers A and B moves in an up-down direction of the screen of the first LFD 20 or in a forward-backward direction of the screen, as well as in the left-right direction of the screen.

As yet another variation, when a three-dimensional coordinate position of eyes predicted for each of the viewers A and B in the same manner as the above variation is out of a viewing angle (for example, 130 degrees) of the first LFD 20, the controller 11 of the information processing apparatus 10 may perform the following processing. Specifically, the controller 11 estimates a three-dimensional coordinate position of eyes corresponding to a limit value of the viewing angle, based on a three-dimensional coordinate position of the eyes before a predetermined time from the current time. The controller 11 then generates an estimation image according to the estimated three-dimensional coordinate position of the eyes, in the same manner as in step S110 in the above embodiment. The controller 11 then identifies a channel (for example, channel 1 or 69) associated with the limit value of the viewing angle. Then, the controller 11 outputs the generated estimation image to the identified channel (for example, channel 1 or 69).

As yet another variation, when it is determined based on the three-dimensional coordinate position of the eyes identified in step S100 in the above embodiment that none of the viewers A and B is present in an emission direction of a light ray of the first LFD 20, the controller 11 of the information processing apparatus 10 may determine to output a predetermined image or not to output an image to a channel associated with an emission angle of the light ray. The predetermined image may be, for example, an image of the virtual space in which the three-dimensional model corresponding to the viewer C is disposed, viewed from a virtual camera disposed on a coordinate axis of the virtual space corresponding to the z axis illustrated in FIG. 4, as a viewpoint, but is not limited to this.

As yet another variation, the viewers A and B may be provided with any three-dimensional content, such as a three-dimensional game, instead of the online conference. In this case, the image A2 generated in step S110 in the above embodiment may be an image of virtual space containing a three-dimensional model corresponding to a character in the three-dimensional game, viewed from the virtual camera A1 as a viewpoint, but is not limited to this. The image B2 generated in step S110 in the above embodiment may be an image of the virtual space containing the three-dimensional model corresponding to the character in the three-dimensional game, viewed from the virtual camera B1 as a viewpoint, but is not limited to this.

As yet another variation, the viewer C may view a conventional two-dimensional display, such as a liquid crystal display (LCD) or an organic electro luminescence (EL), instead of the second LFD 40.

As yet another variation, an embodiment in which a general purpose computer functions as the information processing apparatus 10 according to the above embodiment can also be implemented. Specifically, a program in which processes for realizing the functions of the information processing apparatus 10 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing apparatus comprising a controller configured to:
    for each of a first viewer and a second viewer of a light field display:
        identify a three-dimensional coordinate position of eyes;
        generate an image according to the three-dimensional coordinate position of the eyes;
        identify, based on the three-dimensional coordinate position of the eyes, a channel to which the image is to be output, of a plurality of channels respectively associated with a plurality of light rays to be emitted from the light field display;
        output the image to the channel; and
        predict a predicted three-dimensional coordinate position of the eyes after a current time;
    determine whether the predicted three-dimensional coordinate position of the eyes of the first viewer coincides with the predicted three-dimensional coordinate position of the eyes of the second viewer;
    based on the predicted three-dimensional coordinate position of the eyes of the first viewer coinciding with the predicted three-dimensional coordinate position of the eyes of the second viewer:
        determine which of the first viewer and the second viewer is a closest viewer to the light field display;
        generate a prediction image according to the predicted three-dimensional coordinate position of the eyes of the closest viewer;
        identify a prediction channel to which the prediction image is to be output, based on the predicted three-dimensional coordinate position of the eyes of the closest viewer; and
        output the prediction image to the prediction channel; and
    based on the predicted three-dimensional coordinate position of the eyes of the first viewer not coinciding with the predicted three-dimensional coordinate position of the eyes of the second viewer, for each of the first viewer and the second viewer:
        generate a prediction image according to the predicted three-dimensional coordinate position of the eyes;
        identify a prediction channel to which the prediction image is to be output, based on the predicted three-dimensional coordinate position of the eyes; and
        output the prediction image to the prediction channel.

2. The information processing apparatus according to claim 1, wherein the controller is further configured to, for each of the first viewer and the second viewer, output the image to an adjacent channel associated with an adjacent emission angle adjacent to an emission angle of a light ray associated with the channel.

3. The information processing apparatus according to claim 1, wherein the predicted three-dimensional coordinate position is predicted based on a previous three-dimensional coordinate position of the eyes before the current time.

4. The information processing apparatus according to claim 3, wherein the controller is further configured to, for each of the first viewer and the second viewer:
   determine whether the predicted three-dimensional coordinate position of the eyes is out of a viewing angle of the light field display; and
   based on the predicted three-dimensional coordinate position of the eyes being out of the viewing angle of the light field display:
      estimate an estimated three-dimensional coordinate position of eyes corresponding to a limit value of the viewing angle, based on the previous three-dimensional coordinate position of the eyes before the current time;
      generate an estimation image according to the estimated three-dimensional coordinate position of the eyes;
      identify a limit channel associated with the limit value of the viewing angle; and
      output the estimation image to the limit channel.

5. The information processing apparatus according to claim 1, wherein the controller is further configured to:
   determine, based on the three-dimensional coordinate position of the eyes, that none of the first viewer and the second viewer is present in an emission direction; and
   output a predetermined image or not output an image to a channel associated with the emission direction.

6. A method performed by an information processing apparatus, the method comprising:
   for each of a first viewer and a second viewer of a light field display:
      identifying a three-dimensional coordinate position of eyes;
      generating an image according to the three-dimensional coordinate position of the eyes;
      identifying, based on the three-dimensional coordinate position of the eyes, a channel to which the image is to be output, of a plurality of channels respectively associated with a plurality of light rays to be emitted from the light field display;
      outputting the image to the channel; and
      predicting a predicted three-dimensional coordinate position of the eyes after a current time;
   determining whether the predicted three-dimensional coordinate position of the eyes of the first viewer coincides with the predicted three-dimensional coordinate position of the eyes of the second viewer;
   based on the predicted three-dimensional coordinate position of the eyes of the first viewer coinciding with the predicted three-dimensional coordinate position of the eyes of the second viewer:
      determining which of the first viewer and the second viewer is a closest viewer to the light field display;
      generating a prediction image according to the predicted three-dimensional coordinate position of the eyes of the closest viewer;
      identifying a prediction channel to which the prediction image is to be output, based on the predicted three-dimensional coordinate position of the eyes of the closest viewer; and
      outputting the prediction image to the prediction channel; and
   based on the predicted three-dimensional coordinate position of the eyes of the first viewer not coinciding with the predicted three-dimensional coordinate position of the eyes of the second viewer, for each of the first viewer and the second viewer:
      generating a prediction image according to the predicted three-dimensional coordinate position of the eyes;
      identifying a prediction channel to which the prediction image is to be output, based on the predicted three-dimensional coordinate position of the eyes; and
      outputting the prediction image to the prediction channel.

7. A non-transitory computer readable medium storing a program configured to cause a computer to execute operations, the operations comprising:
   for each of a first viewer and a second viewer of a light field display:
      identifying a three-dimensional coordinate position of eyes;
      generating an image according to the three-dimensional coordinate position of the eyes;
      identifying, based on the three-dimensional coordinate position of the eyes, a channel to which the image is to be output, of a plurality of channels respectively associated with a plurality of light rays to be emitted from the light field display;
      outputting the image to the channel; and
      predicting a predicted three-dimensional coordinate position of the eyes after a current time;
   determining whether the predicted three-dimensional coordinate position of the eyes of the first viewer coincides with the predicted three-dimensional coordinate position of the eyes of the second viewer;
   based on the predicted three-dimensional coordinate position of the eyes of the first viewer coinciding with the predicted three-dimensional coordinate position of the eyes of the second viewer:
      determining which of the first viewer and the second viewer is a closest viewer to the light field display;
      generating a prediction image according to the predicted three-dimensional coordinate position of the eyes of the closest viewer;
      identifying a prediction channel to which the prediction image is to be output, based on the predicted three-dimensional coordinate position of the eyes of the closest viewer; and
      outputting the prediction image to the prediction channel; and
   based on the predicted three-dimensional coordinate position of the eyes of the first viewer not coinciding with the predicted three-dimensional coordinate position of the eyes of the second viewer, for each of the first viewer and the second viewer:
      generating a prediction image according to the predicted three-dimensional coordinate position of the eyes;
      identifying a prediction channel to which the prediction image is to be output, based on the predicted three-dimensional coordinate position of the eyes; and
      outputting the prediction image to the prediction channel.

* * * * *